United States Patent
Wille et al.

(10) Patent No.: US 10,774,233 B2
(45) Date of Patent: Sep. 15, 2020

(54) FLUOROPOLYMER COMPOSITIONS WITH IMPROVED MECHANICAL DAMPENING

(71) Applicant: Arkema Inc., King of Prussia, PA (US)

(72) Inventors: Roice A. Wille, Malvern, PA (US); Kurt A. Wood, Abington, PA (US)

(73) Assignee: ARKEMA INC., King of Prussia, PA (US)

( * ) Notice: Subject to any disclaimer, the term of this patent is extended or adjusted under 35 U.S.C. 154(b) by 203 days.

(21) Appl. No.: 15/778,407

(22) PCT Filed: Nov. 16, 2016

(86) PCT No.: PCT/US2016/062223
§ 371 (c)(1),
(2) Date: May 23, 2018

(87) PCT Pub. No.: WO2017/091408
PCT Pub. Date: Jun. 1, 2017

(65) Prior Publication Data
US 2018/0355205 A1 Dec. 13, 2018

Related U.S. Application Data

(60) Provisional application No. 62/259,796, filed on Nov. 25, 2015.

(51) Int. Cl.
| | | |
|---|---|---|
| *C08F 259/08* | (2006.01) | |
| *C09D 127/16* | (2006.01) | |
| *C09D 151/00* | (2006.01) | |
| *C08L 27/16* | (2006.01) | |
| *C08F 285/00* | (2006.01) | |
| *C09D 5/02* | (2006.01) | |

(52) U.S. Cl.
CPC .......... *C09D 127/16* (2013.01); *C08F 259/08* (2013.01); *C08F 285/00* (2013.01); *C09D 5/022* (2013.01); *C09D 151/003* (2013.01); *C08L 2205/02* (2013.01); *C08L 2205/03* (2013.01)

(58) Field of Classification Search
CPC ............. C09D 127/16; C09D 133/04–133/133

USPC ........................................................ 525/199
See application file for complete search history.

(56) References Cited

U.S. PATENT DOCUMENTS

| | | |
|---|---|---|
| 3,051,677 A | 8/1962 | Rexford |
| 3,178,399 A | 4/1965 | Lo |
| 3,475,396 A | 10/1969 | McCain et al. |
| 3,857,827 A | 12/1974 | Dohany |
| 5,169,901 A | 12/1992 | Takahashi et al. |
| 5,169,902 A | 12/1992 | Yagi et al. |
| 5,349,003 A | 9/1994 | Kato et al. |
| 6,187,885 B1 | 2/2001 | Barber |
| 6,586,547 B1 | 7/2003 | Amin-Sanayei et al. |
| 6,680,357 B1 | 1/2004 | Hedhli et al. |
| 6,841,616 B2 | 1/2005 | Wille et al. |
| 7,122,610 B2 | 10/2006 | Wille et al. |
| 8,338,518 B2 | 12/2012 | Amin-Sanayei et al. |
| 2004/0019145 A1 | 1/2004 | Imoto et al. |
| 2011/0118403 A1 | 5/2011 | Wood et al. |

OTHER PUBLICATIONS

PCI Magazine, Aug. 2001, "Self-Crosslinking Surfactant-Free Acrylic Dispersions for High-Performance Coatings Applications".
Chen, Su et al. Colloid Polym. Sci. 2006, 284, 413-421.
Li, Y. et al. Macromolecules 2008, 41, 3120-3124.

*Primary Examiner* — Ramsey Zacharia
(74) *Attorney, Agent, or Firm* — Joanne Rossi

(57) ABSTRACT

The invention relates to an aqueous fluoropolymer hybrid composition having superior weathering resistance while maintaining excellent mechanical properties in coatings, paints, caulks and adhesives. The composition is comprised of: a) a vinylidene fluoride polymer, such as KYNAR® polymers from Arkema, b) a first vinyl polymer immiscible with the vinylidene fluoride polymer and having a Tg of less than 0° C., and c) a second vinyl polymer of a different composition, also having a Tg of less than 0° C., and containing groups capable of crosslinking. The invention also relates to waterborne coatings or paints containing the aqueous fluoropolymer hybrid composition, and an article, object, or structure coated with the fluoropolymer hybrid composition on at least one surface, either in a factory or in the field, to confer protection and decorative properties. Free films made from the waterborne compositions of the invention have a dynamic mechanical analysis loss tangent, tan (δ), of greater than 0.22 at a temperature of 0° C.

21 Claims, No Drawings

FLUOROPOLYMER COMPOSITIONS WITH IMPROVED MECHANICAL DAMPENING

This application is related to and claims the benefit, under U.S.C. § 119 or § 365, of PCT Application Number PCT/US2016/062223, filed Nov. 16, 2016; and U.S. Provisional Application No. 62/259,796 filed on Nov. 25, 2015.

FIELD OF THE INVENTION

Aqueous, fluoropolymer hybrid compositions are provided that have superior weathering resistance while maintaining excellent mechanical properties in coatings, paints, caulks and adhesives. The compositions are comprised of: a) a vinylidene fluoride polymer, b) a first vinyl polymer immiscible with the vinylidene fluoride polymer and having a glass transition temperature (Tg) of less than 0° C., and c) a second vinyl polymer of a different composition than the first vinyl polymer, also having a Tg of less than 0° C., and containing groups capable of crosslinking. Further provided are waterborne coatings or paints containing the aqueous fluoropolymer hybrid compositions and an article, object, or structure coated with the fluoropolymer hybrid composition on at least one surface, either in a factory or in the field, to confer protection and decorative properties. Free films made from the waterborne compositions of the invention have a dynamic mechanical analysis loss tangent, tan($\delta$), of greater than 0.22 at a temperature of 0° C.

BACKGROUND OF THE INVENTION

Coatings, paints, caulks and adhesives are often subject to weathering conditions that shorten their useful lifetimes. In addition, they can be subjected to mechanical impacts and abrasions that create damage areas in the surfaces that serve as a starting points for failure mechanisms. Fluoropolymers are known for their outstanding weathering resistance in the architectural coatings area, and in films used in outdoor applications such as for solar panel components. Improvement of their mechanical properties can further extend their utility in these and other areas, such as in industrial coatings, caulks and adhesives used in locations requiring good weathering and mechanical properties. An approach to improving the mechanical properties of fluoropolymer coatings, paints, caulks and adhesives is to modify the weathering-resistant fluoropolymer with other polymers that improve mechanical properties. The degree and nature of mixing different polymers are important parameters in the final properties of the mixture. By making the mixtures using a seeded emulsion polymerization process, very intimate mixing can be achieved, and the waterborne emulsion process provides an environmentally sound material that can be used to make the weatherable coatings, paints, caulks and adhesives with improved mechanical properties.

Fluoropolymer hybrid compositions are described in U.S. Pat. No. 5,349,003 with the optional polymerization of some immiscible monomer in a single stage acrylic polymerization process. Two-stage acrylic or methacrylic polymerizations were not described and no mention of glass transition temperatures or low temperature mechanical performance was made. The fluoropolymer was specified as a copolymer made with vinylidene fluoride and tetrafluoroethylene monomers, or a terpolymer made with vinylidene fluoride, tetrafluoroethylene, and hexafluoropropylene monomers. A copolymer of vinylidene fluoride and hexafluoropropylene was not described.

A seeded emulsion polymerization process was used in US 2004/0019145 A1 to make fluoropolymer hybrid compositions using a single stage acrylic or methacrylic polymerization on a fluoropolymer seed latex. Two-stage acrylic or methacrylic polymerizations were not presented. Despite describing a large list of alkyl groups that could be present in the acrylic or methacrylic copolymers, no mention was made of immiscibility and its use to improve mechanical properties. Instead, compatibility between the fluorine-containing seed latex and the acrylic or methacrylic copolymers was emphasized. No mention was made of glass transition temperatures. The single stage acrylic or methacrylic polymerization process lacks the versatility of a two-stage process, where the different stages can be tailored, for example, to emphasize a mechanical or other property on one hand, and cross-linking behavior on the other hand.

Hybrid core-shell latex made by polymerization of some immiscible monomer on a vinylidene fluoride-hexafluoropropylene (FKM-40) seed latex was shown in Chen, Su et al. *Colloid Polym. Sci.* 2006, 284, 413-421. The polymerization was a single stage acrylic polymerization process. Two-stage acrylic or methacrylic polymerizations were not presented. The ratios of fluoropolymer to acrylic presented ranged from 4-50 wt %, a lower fluoropolymer to acrylic weight ratio than needed for good weathering properties. There was no discussion of glass transition temperatures.

Improved ductility and impact properties of melt-blended polyvinylidene fluoride and acrylic rubber materials that have up to 10 wt % acrylic rubber was shown in Li, Y. et al. *Macromolecules* 2008, 41, 3120-3124. The acrylic rubber was mechanically dispersed in the polyvinylidene fluoride. Dynamic mechanical analysis and transmittance electron microscopy showed phase-separated behavior between the polyvinylidene fluoride and the acrylic rubber. Glass-transition temperatures below 0° C. were observed. The methods used to make the compositions did not demonstrate a way to make waterborne coatings that provide the improved mechanical properties, and the acrylic rubber composition is unknown other than being acrylic.

Fluoropolymer hybrid compositions are claimed in WO 2010/005756 A1 that are comprised of a fluoropolymer, a first vinyl polymer that is miscible with said fluoropolymer, and a second vinyl polymer having a different composition than said first vinyl polymer and having a Tg of less than 30° C., and optionally other vinyl polymers, where the fluoropolymer dispersion has a minimum film forming temperature of less than 20° C. The compositions are directed toward coatings having a minimum film forming temperature of less than 5° C. and a maximum volatile organic compound content of 50 g/liter without a significant loss of weatherability or dirt resistance. There is no discussion of the mechanical properties of the coatings or what compositions would be advantageous in producing favorable mechanical properties. The first vinyl polymer is required to be miscible with the fluoropolymer, which limits the use of monomers that promote good dampening properties. No mention is made of the glass transition temperature of the first vinyl polymer which, if, higher than 0° C., will give material that embrittles at lower temperatures. A glass transition temperature less than 0° C. for the second vinyl polymer was said to give poor dirt pickup properties, and therefore undesirable.

SUMMARY OF THE INVENTION

Fluoropolymer hybrid compositions are made using a seeded emulsion polymerization process whereby a dispersed vinylidene fluoride polymer in a latex is used as a seed latex, a first vinyl polymer is made by polymerization of monomers on the fluoropolymer seed latex, and a second vinyl polymer is made by polymerization of monomers on the latex containing the fluoropolymer seed latex and the first vinyl polymer.

The vinylidene fluoride polymer is comprised of a polymer made from vinylidene fluoride monomer and at least one other monomer to form a copolymer, terpolymer, or higher polymer, with a composition selected to contain at least 70 mol % vinylidene fluoride monomer units.

The vinylidene fluoride polymer is in an aqueous dispersion that can be produced by any conventional emulsion polymerization method as long as the fluoropolymer particle size remains under 300 nm, more preferably under 200 nm. The aqueous fluoropolymer dispersion can be prepared, for instance, by emulsion polymerization of vinylidene fluoride and hexafluoropropylene monomers in an aqueous medium, in the presence of a surfactant, an initiator, a chain transfer agent, and a pH adjusting agent.

The first vinyl polymer is substantially comprised of acrylic and/or methacrylic monomer units which are non-functionalized and which are known to produce polymers that are immiscible with the vinylidene fluoride polymer (such monomer units are termed immiscible monomers). The acrylic and methacrylic immiscible monomers have the following structures:

acrylics: CH$_2$=CH—C(=O)—OR
methacrylics: 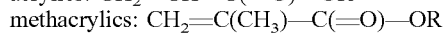CH$_2$=C(CH$_3$)—C(=O)—OR in which R is a hydrocarbon group of four or more carbons, and which may be a linear or branched hydrocarbon group.

By "substantially comprised" is meant the immiscible monomer units comprise 25-100 wt %, preferably 40-100 wt %, and most preferably 55-100 wt % of the first vinyl polymer. The remainder of the first vinyl polymer is comprised of other monomer units selected singly or in any combination from the following monomers: acrylic and/or methacrylic monomers that have hydrocarbon ester groups of three or less carbons that may be linear or branched; styrene; α-methylstyrene; and, up to 5 wt % functionalized monomers different than styrene or α-methylstyrene. The first vinyl polymer may be a homopolymer of a non-functionalized immiscible monomer or may be a copolymer, terpolymer, or higher polymer of non-functionalized immiscible monomers, acrylic and/or methacrylic monomers that have hydrocarbon ester groups of three or less carbons that may be linear or branched; styrene; α-methylstyrene; and, up to 5 wt % functionalized monomers different than styrene or α-methylstyrene. The first vinyl polymer must remain immiscible with the vinylidene fluoride polymer, and the first vinyl polymer has a glass transition temperature of less than 0° C., in the range of −100 to 0° C., preferably −70 to 0° C., and most preferably from −70 to −10° C. before any crosslinking takes place.

The second vinyl polymer is comprised of at least 50 wt % acrylic and/or methacrylic monomer units, and up to 50 wt % of other monomer units capable of polymerizing with acrylic and/or methacrylic monomer units. The second vinyl polymer contains at least 5 wt % functionalized monomer. Some of the functionalized monomer units of the second vinyl polymer contain functional groups capable of crosslinking. The second vinyl polymer is of a different composition than the first vinyl polymer and it has a Tg of less than 0° C., in the range of −70 to 0° C., preferably −50 to −5° C., and most preferably from −40 to −5° C. before any crosslinking reaction takes place. The second vinyl polymer may be a mixture of monomer units with and without functional groups capable of crosslinking and other functional groups, and the monomer units with functional groups may be a mixture of monomer units having different functionalities. The second vinyl polymer may be a homopolymer, copolymer, terpolymer, or higher polymer.

DETAILED DESCRIPTION OF THE INVENTION

By "miscible", as used herein is meant that a polymer blend shows a single glass transition by differential scanning calorimetry, at an intermediate temperature from the glass transition temperatures of the neat component polymers. By "immiscible" is meant that a polymer blend shows 2 different glass transitions by differential scanning calorimetry, occurring between or at the glass transition temperatures of the neat component polymers.

"Copolymer" is used to mean a polymer having 2 or more different monomer units.

Fluoropolymer hybrid compositions are made using a seeded emulsion polymerization process whereby a dispersed vinylidene fluoride polymer in a latex is used as a seed latex, a first vinyl polymer is made by polymerization of monomers on the fluoropolymer seed latex, and a second vinyl polymer is made by polymerization of monomers on the latex containing the fluoropolymer seed latex and the first vinyl polymer.

The vinylidene fluoride polymer is comprised of a polymer made from vinylidene fluoride monomer and at least one other monomer to form a copolymer, terpolymer, or higher polymer, with a composition selected to contain at least 70 mol % vinylidene fluoride monomer units. Examples of suitable monomers that can be used with vinylidene fluoride are perfluoroalkenes, such as hexafluoropropylene; chlorotrifluoroethylene; perfluoroalkyl vinyl ethers, such as perfluoromethyl vinyl ether, perfluoroethyl vinyl ether, and perfluoropropyl vinyl ether; tetrafluoroethylene; 2,3,3,3-tetrafluoropropene; 3,3,3-trifluoropropene; and when used with at least one other fluorinated monomer in addition to vinylidene fluoride, the monomers ethylene; perfluoroalkyl ethylene, such as perfluorobutyl ethylene; perfluoro-2,2-dimethyl-1,3-dioxole; and, perfluoro-2-methylene-4-methyl-1,3-dioxolane.

The vinylidene fluoride polymer is in an aqueous dispersion that can be produced by any conventional fluoropolymer emulsion polymerization method as long as the fluoropolymer particle size remains under 300 nm, more preferably under 200 nm. Fluoropolymer emulsion polymerization processes are well known in the literature, with U.S. Pat. Nos. 3,051,677, 3,178,399, 3,475,396, 3,857,827, 6,187,885, 6,586,547, 6,841,616, 7,122,610, and 8,338,518 as some specific examples. The fluoropolymer dispersion is preferably synthesized using free-radical initiation. Chain transfer agents, buffering agents, antifoulants, and other additives typically used in a fluoropolymer emulsion process may be present.

A first vinyl polymer is made by polymerization of monomers on the fluoropolymer seed latex. The first vinyl polymer is substantially comprised of acrylic and/or methacrylic monomer units which are non-functionalized and which are known to produce polymers that are immiscible with the vinylidene fluoride polymer (such monomer units are termed immiscible monomers). The acrylic and methacrylic immiscible monomers have the following structures:

acrylics: CH$_2$=CH—C(=O)—OR
methacrylics: 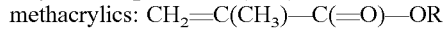CH$_2$=C(CH$_3$)—C(=O)—OR in which R is a hydrocarbon group of four or more carbons, and which may be a linear or branched hydrocarbon group.

By substantially comprised is meant the immiscible monomer units comprise 25-100 wt %, preferably 40-100 wt %, and most preferably 55-100 wt % of the first vinyl polymer. Representative immiscible monomers are n-butyl acrylate, isobutyl acrylate, 2-ethylhexyl acrylate, isooctyl acrylate, isodecyl acrylate, octyl methacrylate, isooctyl methacrylate, dodecyl methacrylate, tridecyl methacrylate and octadecyl methyacrylate. The remainder of the first vinyl polymer is comprised of other monomer units selected singly or in any combination from the following monomers: acrylic and/or methacrylic monomers that have hydrocarbon ester groups of three or less carbons that may be linear or branched; styrene; α-methylstyrene; and, up to 5 wt % functionalized monomers different than styrene or α-methylstyrene. Examples of acrylic and/or methacrylic ester monomers that have hydrocarbon ester groups of three or less carbons that may be linear or branched are methyl acrylate, ethyl acrylate, methyl methacrylate, and ethyl methacrylate. The first vinyl polymer may include functionalized monomers up to 5 wt %, preferably up to 2 wt %, examples of which are shown in the definition of the second vinyl polymer. The first vinyl polymer may be a homopolymer of a non-functionalized immiscible monomer or may be a copolymer, terpolymer, or higher polymer of non-functionalized immiscible monomers, acrylic and/or methacrylic ester monomers that are non-functionalized and which have ester hydrocarbon R groups of three or less carbons that may be linear or branched; styrene; α-methylstyrene; and, up to 5 wt % functionalized monomers. Whether the first vinyl polymer contains only non-functionalized immiscible monomer, or it also selectively contains other monomers, the composition of the first vinyl polymer is such that it remains immiscible with the vinylidene fluoride polymer and that it has a glass transition temperature of less than 0° C., in the range of −100 to 0° C., preferably −70 to 0° C., and most preferably from −70 to −10° C., before any crosslinking takes place.

A second vinyl polymer is made by polymerization of monomers on the latex containing the fluoropolymer seed latex and the first vinyl polymer. The second vinyl polymer is comprised of at least 50 wt % acrylic and/or methacrylic monomer units, and up to 50 wt % of other monomer units capable of polymerizing with acrylic and/or methacrylic monomer units. The second vinyl polymer must contain at least 5 wt % functionalized monomer units, preferably greater than 7 wt %, and most preferably greater than 10 wt %. The second vinyl polymer may be a homopolymer, copolymer, terpolymer, or higher polymer. Some of the monomer units of the second vinyl polymer contain functional groups capable of crosslinking. As used herein, the weight percent of functional monomer means the weight percent of monomers having a functional group. The second vinyl polymer is of a different composition than the first vinyl polymer and it has a Tg of less than 0° C., in the range of −70 to 0° C., preferably −50 to −5° C., and most preferably from −40 to −5° C. before any cross-linking reaction takes place. The second vinyl polymer may be a mixture of monomer units with and without functional groups capable of crosslinking and also other functional groups, and the monomer units with functional groups may be a mixture of monomer units having different functionalities. Examples of functional groups that may be selected are unsaturated carboxylic acids such as acrylic acid, methacrylic acid, fumaric acid, crotonic acid, and itaconic acid; vinyl phosphonic and sulfonic acids; amide compounds such as acrylamide, methacyrlamide, N-methylmethacrylamide, N-methylolmethacrylamide, N-alkylacylamide, N-alkylmethacrylamide, N,N-dialkylacylamide, and N,N-dialkylmethacrylamide; hydroxyl-containing monomers such as hydroxyethyl acrylate, hydroxyethyl methacrylate, hydroxypropyl acrylate, hydroxypropyl methacrylate, hydroxybutyl acrylate, hydroxybutyl methacrylate, diethylene glycol ethyl ether acrylate, polyethylene glycol acrylates and methacrylates, and polypropylene glycol acrylates and methacrylates; allyl ether methacrylate; acetoacetoxyethyl methacrylate; vinyl acetate; epoxy containing monomers such as glycidyl acrylate and glycidyl methacrylate; monomers containing cyclic substituents, such as cyclohexyl acrylate, tetrahydrofufuryl acrylate and methacrylate, and isobornyl acrylate; monomers containing silanols; fluoroalkyl acrylates and methacrylates; acrylonitrile and methacrylonitrile. The functionalized monomer units may have more than one functional unit as part of their compositions, examples of which are polyol acrylates and methacrylates, including diol-diacrylates, diol-dimethacrylates, triol-triacrylates and triol-trimethacrylates, and tetraol-tetraacrylates, representative of which are 1,4 butanediol diacrylate, 1,6-hexanediol diacrylate, tetraethylene glycol diacrylate, tripropylene glycol diacrylate, ethylene glycol dimethacrylate, 1,3-propanediol dimethacrylate, 1,3-butanediol dimethacrylate, 1,4-butanediol dimethacrylate, 1,6-hexanediol dimethacrylate, triethylene glycol dimethacrylate, tetraethylene glycol dimethacrylate, trimethylol propane triacrylate, trimethylolpropane trimethacrylate, and pentaerythritol tetraacrylate. The second vinyl polymer includes functional groups used in crosslinking systems. Some representative functional groups used in crosslinking systems with acrylic and methacrylic monomer units are described in PCI Magazine, August 2001, "Self-Crosslinking Surfactant-Free Acrylic Dispersions for High-Performance Coatings Applications," and references therein, and in U.S. Pat. No. 6,680,357. Functional groups for crosslinking include carboxylic acid groups, hydroxyl groups, amine groups, epoxide groups, and acetoacetoxy groups. The monomer units bearing functional groups are often used with other compounds to effect crosslinking, such as with carbodiimides, isocyanates, amines, alpha-hydroxy ketones, hydrazides, and aziridines as some examples.

The emulsion polymerization of the monomers on the fluoropolymer seed latex to make the first vinyl polymer, and the emulsion polymerization of monomers on the latex containing the fluoropolymer seed latex and the first vinyl polymer to make the second vinyl polymer, are conventional seeded emulsion polymerizations known in the art for making acrylic and/or methacrylic polymers.

Elements of conventional seeded emulsion polymerizations are monomers, initiators, surfactants, chain-transfer agents, pH regulators, solvents, and chelating agents, some or all of which may be added to a seed latex to effect further polymerization. Temperatures used are normally in the range of 20 to 150° C., preferably from 20 to 90° C. The reactions are normally targeted to run at atmospheric pressure, but pressure might build and require venting, normally at less than 3 or 4 atmospheres. The reactions are normally run in inert atmospheres, such as under nitrogen. When the reactions to make the first and second vinyl polymers are done, the monomer addition method may be a batch method, in which monomer, which can mean a single monomer or a monomer mixture, is added all at once, a semicontinuous method, in which some monomer is added at the beginning, and then the remainder of the monomer is added in batches or continuously, or a continuous method, in which monomer is added throughout most or all of the reaction. Monomer compositions may be fed as a fixed composition or may be fed with gradients in composition.

Initiators that produce free radicals are used to begin and maintain the polymerization process, and may be also be used as chasers for the purpose of driving residual monomers to low levels in the final latex products. Examples of radical initiators that may be used are peroxydisulfate salts; peroxides such as hydrogen peroxide and benzoyl peroxide; hydroperoxides such as t-butyl hydroperoxide, t-amyl hydroperoxide, and cumene hydroperoxide; peroxyesters; peroxydicarbonates, such as di-n-propyl peroxydicarbonate; and azo initiators such as 2,2'-azobisisobutyronitrile, 2,2'-azobis(2-methylbutyronitrile), and 2,2'-azobis(2-methylpropionamidine) dihydrochloride. Redox initiator systems are often used which combine an oxidant, such as a peroxydisulfate salt, or a hydroperoxide, such as t-butyl hydroperoxide, with a reductant, such as sodium formaldehyde, sulfoxylate, sodium glyoxylate sulfoxylate, sodium metabisulfite, or ascorbic acid. The redox system may use a promoter such as ferrous sulfate to help maintain a redox cycle during radical production, and a chelating agent, such as ethylene diamine tetraacetic acid, may be included to control the solubility and reactivity of the particular metal ions that are used. Many redox systems are known in the art. Thermal initiators that form free radicals by heating can be used with reversible addition-fragmentation transfer (RAFT) agents to help carry the polymerization, examples of which are xanthates, dithiobenzoates, and trithiocarbonates. Initiator usage is from 0.01 to 2 weight percent of the total monomers used in the acrylic and/or methacrylic polymerization.

Many surfactants may be used to form the emulsions for the polymerization process up to six weight percent on the total monomers used for the acrylic and/or methacrylic polymerization. Surfactants may be used in acid, anionic, cationic, or nonionic form. Often anionic surfactants, or anionic surfactants in combination with nonionic surfactants are used, with the anionic surfactants used as sodium, potassium, or ammonium salts, although other salts may also be useful. Some representative anionic surfactants include alkyl sulfates, alkyl sulfonates, alkyl benzenesulfates, alkyl benzenesulfonates, and disulfonates, alkyl succinates, alkyl and dialkyl sulfosuccinates, alkyl ether sulfates, mono and dialkyl phosphates, linear alcohol ethoxylate phosphates, tristyryl alcohol ethoxylate phosphates, polyvinyl acids, polyacrylic and methacrylic acids, alkyl phenol ether sulfates, fatty alcohol ether sulfates, fatty alcohol sulfates, and oleic acid sulfonates. Some representative nonionic surfactants are polyethylene oxides, polypropylene oxides, copolymers and terpolymers of ethylene oxide and propylene oxide, polyvinyl alcohol, glycerol esters, sorbitan alkyl esters, linear alcohol ethoxylates, unsaturated alcohol ethoxylates, alkyl phenol ethoxylates, and tristyryl alcohol ethoxylates. Cationic surfactants include alkyl ammonium chlorides and alkyl pyridinium chlorides. Amphoteric surfactants such as betaines, an example of which is lauryl betaine, may be used, and reactive surfactants may be used to promote emulsion stability.

Chain-transfer agents to control the molecular weight of the polymer product can be used in the range of zero to five weight percent of the total monomers used in the acrylic and/or methacrylic polymerization. Often mercaptans are used in emulsion polymerizations to make acrylic and/or methacrylic polymers, with examples being dodecylmercaptan, octyl mercaptan, or isooctyl-3-mercaptopropionate. Other agents can be used, such as xanthogen disulfides, an example being dimethylxanthogen disulfide, thiuram disulfides, and halogenated hydrocarbons, examples being chloroform and carbon tetrachloride.

Some amount of solvent may be used to facilitate the polymerization process, such as to help with the addition of other reagents used in the reaction. The solvent may be in single compound form or may be a mixture of solvents up to 10 weight percent of the total monomers used in the acrylic and/or methacrylic polymerization. Examples of solvents that might be used are ketones, such as acetone and methyl ethyl ketone, carbonates, such as dimethyl carbonate and propylene carbonate, esters, such as methyl acetate, hydroxyalkyl butyrate and isobutyrate, ethers such as ethylene, polyethylene, propylene, and polypropylene glycol ethers, N-methyl pyrrolidone, and dimethyl sulfoxide.

Buffers and neutralizers can be used during and after the reaction to control the pH and are used in sufficient quantity to give the desired pH. Numerous buffer systems are available, common examples of which are phosphate and carboxylate systems. Neutralizing agents may be used that may be in the form of inorganic salts, such as the sodium, potassium, or ammonium salts of hydroxides, phosphates, carbonates, and bicarbonates, or may be in organic form, such as alkylamines, dialkylamines, trialkylamines, and multifunctional amines. Often the pH is brought to a range of 7-11 at the end of the reaction or after the reaction, to facilitate formulation for a particular applications.

Biocides may be added at the end or after the reaction to prevent biological growth in the latex products of the emulsion polymerization. Many biocides are available for use with latex products. Examples of biocides include hydantoins, such as dimethyloldimethylhydantoin, isothiazolinones, such as methylisothiazolinone and chloromethylisothiazolinone, benzisothiazolinones, such as 1,2-benzisothiazolinone and methylbenzisothiazolinone, iodopropynylbutylcarbamate, bromonitropropanediol, dibromonitrilopropionamide, and pyrithione, such as zinc pyrithione.

The weight percent of vinylidene fluoride polymer in the combined vinylidene fluoride polymer, first vinyl polymer, and second vinyl polymer weight is at least 50% and preferably 60-80%. The first vinyl polymer and second vinyl polymer, in relation to each other, range from a weight ratio of 10:90 to 90:10. The weight percent solids of combined fluoropolymer, first vinyl polymer, and second vinyl polymer in the aqueous, fluoropolymer hybrid compositions is at least 25% and preferably in the range of from 35% to 70%.

The resultant fluoropolymer aqueous hybrid compositions, or latexes, are film forming compositions; that is to say, they are characterized by having a minimum film formation temperature (MFFT) of <5° C., preferably less than <0° C., as measured using an MFFT Bar II (Paul Gardner, Inc.) according to ASTM D 2354. These film forming latexes may be used directly without further formulation to make clear coatings on a substrate, or to make free films (that is, a film without a substrate). Free films may be made from the latexes in a number of ways, but the most straightforward way is to apply the film forming latex in a thin layer on a carrier substrate such as PET film, metal, or glass, dry it at ambient or elevated temperatures, and then remove the dry coating to generate the free film. Free films generated in this way are useful to characterize many of the mechanical properties of the compositions; for instance, they may be used for dynamic mechanical analysis testing, or in HTMECH (high throughput mechanical characterization) testing as described in Rev. Sci. Instrum. 76 062214 (2005); doi: 10.1063/1.1926967.

Alternatively, the latexes may be formulated through the addition of crosslinking agents, viscosity control agents, foam control agents, wetting agents, pigments, fillers, matting and texturing agents, and other agents to adjust properties for specific applications. Coalescing solvents may also optionally be added to the formulations, but these are usually not required in the formulation because of the low MFFT of the fluoropolymer hybrid compositions. As a result, the latex formulations will generally have low VOCs, below 50 g/liter as defined in EPA Method 24.

The formulations may be used as lacquers, coatings, paints, adhesives, caulks and sealants, and to make articles such as films; with the films, coatings, caulks and sealants formed having good physical properties such as toughness, abrasion resistance, impact resistance, flexibility, and resistance to cracking in a conical mandrel test. The dynamic mechanical analysis loss tangent, $\tan(\delta)$, is a particularly useful material property to use to characterize the mechanical dampening ability of a material at any particular temperature. For free films made from formulations of the fluoropolymer hybrid compositions of the invention, as long as the amount of pigment and filler in the film is below about 10% by weight, the dynamic mechanical analysis loss tangent, $\tan(\delta)$, is greater than 0.22, preferably greater than 0.25, and most preferably greater than 0.30 at a temperature of 0° C.

The latexes containing the fluoropolymer hybrid compositions, whether unformulated or formulated, may be used as waterborne coatings or paints for application to an article, object, or structure, either in a factory or in the field, to confer protection and decorative properties.

In one preferred embodiment, useful coating compositions containing the fluoropolymer hybrid composition of the invention may be obtained by adding a complementary external crosslinker in the formulation. Examples of such complementary crosslinking chemistries are described, for example, in U.S. Pat. No. 6,680,357, and in several of the Examples below. Of particular utility are crosslinking chemistries which can be used under ambient conditions, for instance, 2-component systems which use a polyisocyanate crosslinker, various chemistries incorporating acetoacetate functional groups, many of which are described in F. Del Rector et al., Journal of Coatings Technology, vol. 61, No. 771, pp. 31-37 (April 1989), and 1-component chemistries using adipic dihydrazide as a crosslinker. The coating compositions may contain additives typical for use in a coating, including but not limited to, pH adjustment agents, UV stabilizers, colorants, dyes, filler, water-soluble resins, rheology control additives and thickeners, and pigments and pigment extenders.

The compositions of the invention provide improved mechanical properties, including improved crosshatch adhesion, impact resistance, T-bend flexibility, conical mandrel flexibility, pencil hardness, and toughness. Toughness is typically measured by removing the coating from the substrate to create a free coating film, and may be expressed as the area under the stress-strain curve in a tensile elongation test, or by using an HTMECH method.

The fluoropolymer hybrid compositions of the invention are useful as components of field-applied and factory applied coatings and paints, caulks, sealants and adhesives, inks and varnishes, sealants, modifying resins for cements and mortars, consolidating agents, and stains. For instance, they may be used for field-applied protective coatings for structures or objects made out of cementitious substrates, stone, or metals—for instance, as the polymer binder for a highly weatherable topcoat on steel structures, such as bridges, tanks, or water towers, or in factory applied coatings on steel pipes. In some cases, as is well known in the protective coatings industry, they may be applied not directly over the substrate, but over a primer layer, or multiple layers of primer and midcoat, for improved adhesion and system corrosion performance. For instance, they may be used in pigmented topcoat formulations applied over an epoxy, polyamide, acrylic or alkyd primer on steel in a field applied protective coating, with the pigment(s) chosen to bring decorative as well as protective attributes to the coating.

Likewise, the fluoropolymer hybrid compositions of the invention are useful as components of coatings and varnishes applied on flexible substrates, such as flexible PVC, PET film, polycarbonate film, or rubbers of different kinds; or on substrates exhibiting considerable dimensional changes during cycling of temperature or humidity, for example wood, chemically modified wood, and wood-polymer composites. Such coatings may be applied in the field, without the application of additional heat, or they may be applied in a factory, optionally with the application of heat to accelerate the rate of removal of water and the development of full properties.

Based on the information provided, and the Examples, one of skill in the art could imagine many other uses for the composition of the invention.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

EXAMPLES

Test Methods and Definitions

Calculated glass transition temperatures were by use of the Fox equation as described in T. G. Fox *Bull. Am. Phys. Soc.* 1, 123 (1956) from accepted differential scanning calorimetry measured values.

Dynamic mechanical analysis (DMA) was performed at a fixed frequency (1 Hz) over a temperature range of –100° C. to 100° C. Rectangular specimens of 35 mm length and 6 mm width were die cut from the films and aged for a day at room temperature before testing. The specimens were attached in tension at 1 Newton between two clamps with a gap of 20 mm and cooled to the start temperature. A sinusoidal stress was applied to the sample and the resultant displacement (strain) and phase lag ($\delta$) were recorded as a function of increasing temperature. The heating ramp rate was 3° C./min and the strain amplitude was 0.1 mm within the linear viscoelastic region.

Testing of coating flexibility on aluminum by the conical mandrel method was performed according to ASTM D522, Test Method A, using a bend time of 1 second. For tests run at sub-ambient temperatures, both the coated panels and the conical mandrel itself were equilibrated at the test temperature prior to performing the test.

Testing of coating impact resistance on steel by the direct impact method was performed according to ASTM D2794.

Testing of coating toughness and abrasion resistance using a Taber Abraser method was performed according to ASTM D4060, using CS-10 wheels, and a 1000 g weight, for 500 cycles.

Solids contents of latexes were measured gravimetrically on samples of weights of at least 1 gram. Weight percent solids were measured using a drying temperature of 125° C., with an endpoint indication of 1 mg mean weight loss over a period of 50 seconds.

Abbreviations Used in Examples

TABLE I

Abbreviations Used in Reaction Examples

| Abbreviations | Compounds |
|---|---|
| azo | azobis(2-methylbutyronitrile) |
| BA | n-butyl acrylate |
| EA | ethyl acrylate |
| EGDMA | ethylene glycol dimethacrylate |
| EHA | 2-ethylhexyl acrylate |
| HBA | 4-hydroxybutyl acrylate |
| HPMA | 2-hydroxypropyl methacrylate |
| iomp | isooctyl 3-mercaptopropionate |
| MAA | methacrylic acid |
| MMA | methyl methacrylate |
| smbs | sodium metabisulfite |
| sfs | sodium formaldehyde sulfoxylate |
| tbhp | t-butyl hydroperoxide |
| tpm | tripropylene glycol methyl ether |

General Preparation Method for Reaction Examples 1-8

An aqueous latex of vinylidene fluoride polymer, of 75/25 wt % vinylidene fluoride/hexafluoropropylene monomer units composition was adjusted to a desired solids wt % by the addition of deionized water as necessary. The adjusted latex was added to a jacketed reaction vessel equipped for mechanical stirring and with ports for the addition of reactants and inert gas. A flow of argon was begun, and stirring was begun. An addition of a first monomer mixture, required for the first vinyl polymer, along with isooctyl-3-mercaptopropionate in the mixture, was begun, and simultaneously a mixture of azobis(2-methylbutyronitrile) dissolved in tripropylene glycol methyl ether was begun. The addition of the first monomer mixture was over a period of 50-60 minutes. When the additions of the first monomer mixture and chain-transfer agent, and azobis(2-methylbutyronitrile) in tripropylene glycol methyl ether were complete, stirring at ambient temperature was continued for 30 minutes. The mixture was then heated to 75° C. and held for 30 minutes. An addition of a second monomer mixture, required for the second vinyl polymer, along with isooctyl-3-mercaptopropionate in the mixture, was begun and completed over a period of 60 minutes. After a further 30 minutes, an addition of 70 wt % aqueous t-butyl hydroperoxide further diluted in water was begun. When the t-butyl hydroperoxide addition was complete, an addition of a reducer dissolved in water, sodium formaldehyde sulfoxylate or sodium metabisulfite, was begun. Following the reducer addition, the reaction condition was maintained for 20 minutes and then cooling was begun. The latex was optionally neutralized with 10 wt % ammonium hydroxide solution to a pH of 7.5-8.8, and biocide was optionally added to a level of 800 ppm on the total materials fed to the reactor.

Comparative polymerization example 1 provides an instance of both the first and the second vinyl polymer having a Tg greater than 0° C. Comparative polymerization examples 2-4 are illustrations of the first vinyl polymer having a Tg of less than 0° C., but the second vinyl polymer having a Tg greater than 0° C. Examples 1-4 do not contain the requisite amount of ester hydrocarbon groups of 4 or more carbons in the first vinyl polymer, but do contain functionalized monomer at 5 wt % or less. The comparative examples do not provide formulations that have a DMA tan(δ) of greater than 0.22 at a temperature of 0° C. Polymerization examples 5-8 of the invention illustrate compositions containing the requisite amount of ester hydrocarbon groups of 4 or more carbons in the first vinyl polymer, and example 8 of the invention also provides the use of a functionalized monomer at less than 5 wt % in the first vinyl polymer.

Quantities Used in Reaction Examples 1-8

TABLE II

| Example number | First Vinyl Polymer Monomer Mixture | | | | | | | | | Calculated |
|---|---|---|---|---|---|---|---|---|---|---|
| | First monomer mixture, grams | | | | | | | | | Tg, ° C. |
| | MMA | EA | BA | EHA | EGDMA | HPMA | HBA | MAA | iomp | |
| Comparative | | | | | | | | | | |
| 1 | 91.13 | 25.88 | | | | 5.88 | | 0.34 | 0.21 | 64 |
| 2 | 6.88 | 110.72 | | | | | 5.91 | 0.32 | 0.21 | −20 |
| 3 | 6.73 | 93.40 | | | | 4.00 | | 0.20 | 0.18 | −16 |
| 4 | 6.68 | 110.92 | | | | 5.90 | | 0.32 | 0.23 | −16 |
| Invention | | | | | | | | | | |
| 5 | 40.43 | | 83.34 | | | | | | 0.21 | −20 |
| 6 | 53.79 | | | 69.99 | | | | | 0.20 | −20 |
| 7 | 11.78 | | 61.89 | 50.17 | | | | | 0.20 | −30 |
| 8 | 51.33 | | | 69.99 | 2.49 | | | | 0.20 | −22 |

* Example 8 Tg is calculated on the basis of MMA and EHA only

TABLE III

Second Vinyl Polymer Monomer Mixture

| Example number | Second monomer mixture grams | | | | | | Calculated Tg, °C. |
|---|---|---|---|---|---|---|---|
| | MMA | EA | HPMA | HBA | MAA | iomp | |
| Comparative | | | | | | | |
| 1 | 2.08 | 82.94 | 30.99 | | 7.17 | 0.22 | 5 |
| 2 | 80.24 | 7.66 | | 31.19 | 4.76 | 0.22 | 45 |
| 3 | 88.34 | 80.85 | 44.64 | | 6.46 | 0.38 | 40 |
| 4 | 41.74 | 46.18 | 31.14 | | 4.82 | 0.23 | 39 |
| Invention | | | | | | | |
| 5 | | 5.43 | 82.52 | 31.13 | 4.79 | 0.21 | −20 |
| 6 | | 5.42 | 82.49 | 31.13 | 4.77 | 0.20 | −20 |
| 7 | | 5.41 | 82.46 | 31.14 | 4.80 | 0.20 | −20 |
| 8 | | 5.45 | 82.48 | 31.13 | 4.76 | 0.21 | −20 |

TABLE IV

Overall Reaction Quantities

| quantities are in grams | Example number | | | | | | | |
|---|---|---|---|---|---|---|---|---|
| | Comparative | | | | Invention | | | |
| Reaction Materials | 1 | 2 | 3 | 4 | 5 | 6 | 7 | 8 |
| fluoropolymer latex | 1566.9 | 1551.8 | 1442.5 | 1548.6 | 1548.5 | 1548.5 | 1548.6 | 1548.4 |
| adjusted latex solids | 36.7 | 37.2 | 33.8 | 37.3 | 37.3 | 37.3 | 37.3 | 37.3 |
| azo | 1.6 | 1.6 | 2.1 | 1.6 | 1.6 | 1.6 | 1.6 | 1.6 |
| tpm | 18.5 | 18.5 | 18.0 | 18.5 | 18.5 | 18.5 | 18.5 | 18.4 |
| first monomer mixture | 123.4 | 124.0 | 104.5 | 124.1 | 124.0 | 124.0 | 124.0 | 124.0 |
| second monomer mixture | 123.4 | 124.0 | 220.7 | 124.1 | 124.1 | 124.0 | 124.0 | 124.0 |
| tbhp | 0.51 | 0.52 | 0.68 | 0.51 | 0.52 | 0.52 | 0.52 | 0.52 |
| sfs | 0.62 | 0 | 0 | 0 | 0 | 0 | 0 | 0 |
| smbs | 0 | 0.76 | 1.00 | 0.76 | 0.76 | 0.76 | 0.76 | 0.77 |
| ammonium hydroxide solution | 0 | 0 | 13.5 | 137 | 13.7 | 13.7 | 13.7 | 13.7 |
| biocide | 0 | 0 | 1.5 | 1.5 | 1.5 | 1.5 | 1.5 | 1.5 |
| water for solutions | 40.4 | 39.0 | 52.5 | 52.4 | 52.2 | 52.4 | 52.4 | 52.6 |
| measured final solids, wt % | 43.7 | 43.8 | 44.1 | 44.6 | 43.8 | 43.7 | 43.6 | 43.8 |

Preparation of Waterborne Coatings and Paints

A reaction example, Example 3, from WO 2010/005756 A1, is used as a comparative example in the following preparations of Waterborne Coatings and Paints. The calculated Tg of the first vinyl polymer of the reaction example of WO 2010/005756 A1 is 15° C., and the calculated Tg of the second vinyl polymer of the reaction example of WO 2010/005756 A1 is 16° C.

Preparation of Waterborne Coatings and Paints

TABLE V

Pigment Dispersion Recipes

| Pigment dispersion identifier: | A | B |
|---|---|---|
| water | 100 | 135 |
| ammonium hydroxide (28%) | 0.3 | 0.2 |
| Tamol ® 731A (Dow Chemical)-dispersant | 20 | |
| Disperbyk ® 180 (Altana)-dispersant | | 12.5 |
| TegoFoamex ® 840 (Evonik)-defoamer | 0.8 | |
| TegoFoamex ® 810 (Evonik)-defoamer | | 1.2 |
| Triton ® CF-10 (Dow Chemical)-surfactant | 8 | 5 |
| Kronos ® 2310 rutile TiO2 | 460 | |
| Millennium RCL-6 rutile TiO2 | | 450 |
| Dynamix ® Black 30C965 pigment (Shepherd Color) | | 50 |

* Quantities are weights in grams. Pigment dispersions are ground in a Cowles disperser for 20 minutes until a Hegman grind reading of greater than 7 is reached.

TABLE VI

Formulation Recipes for Comparative Examples

| | Formulation Identifier | | | | | | |
|---|---|---|---|---|---|---|---|
| | C1 | C2 | C3 | C4 | C5 | C6 | C7 |
| "A component" | | | | | | | |
| Reaction example 1 | 100 | | | | | | |
| Reaction example 2 | | 200 | | | | | |
| Reaction example 3 | | | 200 | | | | |
| Reaction example 4 | | | | 133.3 | 133.5 | | |
| example 3, WO 2010/005756 A1 | | | | | | 200 | 200 |
| Water | 40.5 | 15 | 15 | 9.7 | 8 | 30 | 30 |
| Tego Foamex ® 825 (Evonik) | 0.12 | | | | | 0.2 | 0.2 |
| Coapur ® XS-52 (Coatex)-thickener | 0.2 | 1.7 | 1.7 | | | | |
| Coapu ® XS-71 (Coatex)-thickener | | | | 1.3 | 1.1 | | |
| Byk 346 (Altana)-wetting agent | 0.16 | 0.3 | 0.3 | 0.2 | 0.2 | 0.3 | 0.3 |

TABLE VI-continued

Formulation Recipes for Comparative Examples

| | Formulation Identifier | | | | | | |
|---|---|---|---|---|---|---|---|
| | C1 | C2 | C3 | C4 | C5 | C6 | C7 |
| Dipropylene glycol dimethyl ether | | | | | | 2.0 | 2.0 |
| Pigment dispersion A | 33.3 | | | | | | |
| Pigment dispersion B | | 66.7 | 66.7 | 23.5 | 41.5 | | |
| "B component"-added with 10 minutes mixing just before application | | | | | | | |
| Bayhydur ® XP-2655 (Bayer Material Science)-crosslinker | 2.9 | 5.5 | 5.5 | 3.7 | 2.8 | | 5.0 |
| Dipropylene glycol dimethyl ether | 0.7 | 1.4 | 1.4 | 1 | 0.7 | | |

* Quantities are weights in grams

TABLE VII

Formulation Recipes for Examples of the Invention

| | Formulation Identifier | | | | | | |
|---|---|---|---|---|---|---|---|
| | D | E | F | G | H | I | J |
| "A component" | | | | | | | |
| Reaction example 5 | 200 | 200 | | | | | |
| Reaction example 6 | | | 200 | 200 | | | |
| Reaction example 7 | | | | | 200 | 200 | |
| Reaction example 8 | | | | | | | 200 |
| Ammonium hydroxide (28%)-neutralizer | 0.3 | | 0.3 | | 0.3 | | |
| Syloid ® 900W (WR Grace) 15 wt % in water-wetting agent | 50 | | 50 | | 50 | | |
| Tego Foamex ® 825 (Evonik) | 0.2 | 0.2 | 0.2 | 0.2 | 0.2 | 0.2 | 0.2 |
| Coapur ® XS-71 (Coatex)-thickener | 4 | | 4 | | 4 | | |
| Acrysol ® RM-8W (Dow Chemical)-thickener | 4 | 2 | 4 | 2 | 4 | 2 | 2 |
| Byk 346 (Altana)-wetting agent | 0.3 | 0.3 | 0.3 | 0.3 | 0.3 | 0.3 | 0.3 |
| Pigment dispersion B | 20 | 18.5 | 20 | 18.5 | 20 | 18.5 | 18.5 |
| "B component"-added with 10 minutes mixing just before application | | | | | | | |
| Bayhydur ® XP-2655 (Bayer Material Science)-crosslinker | 9.2 | | 9.2 | | 9.2 | | |
| Dipropylene glycol dimethyl ether | | | | | | 1 | |
| Easaqua ® XD-401 (Vencorex)-crosslinker | | 2.6 | | 2.6 | | 2.6 | 2.6 |

* Quantities are weights in grams

Preparation of Free Films from the Formulation Examples

Free films were prepared for testing as follows: Formulations were applied to glass plates using an 8-path wet film applicator (Paul N. Gardner Company, Inc. Item AP-25 SS) using a path depth of 10 mils to give a uniform dry film thickness of around 50 microns. The applied coating formulations were allowed to dry under ambient conditions for 24-48 hours, after which time the coatings, on the glass substrate, where submersed in water for 30-120 minutes, until such time as the coating film could be easily dislodged from the glass substrate without stretching of the film. The free films were then blotted dry with absorbent tissue and aged for at least two additional weeks prior to DMA testing. Defect free regions of the films were visually identified for the testing.

TABLE VIII

DMA Measurements of Films from the Formulation Examples.

| Reaction example | Formulation | DMA tan(δ) at 0° C. |
|---|---|---|
| 1 | C1 | 0.116 |
| 2 | C2 | 0.187 |
| 3 | C3 | 0.161 |
| 4 | C4 | 0.212 |
| 4 | C5 | 0.185 |
| example 3, WO 2010/005756 A1 | C6 | 0.080 |
| example 3, WO 2010/005756 A1 | C7 | 0.098 |
| 5 | D | 0.258 |
| 5 | E | 0.492 |
| 6 | F | 0.234 |
| 6 | G | 0.458 |
| 7 | H | 0.257 |
| 7 | I | 0.554 |
| 8 | J | 0.398 |

White coating formulations:
A white protective coating topcoat formulation was prepared as follows:

TABLE IX

White Pigment Dispersion K

| Add sequentially to a Cowles disperser and mix at 2000 rpm until the mixture reaches a Hegman grind of 7 or better: | Weight (g) |
|---|---|
| Water | 158 |
| Tamol ™ 2011 dispersant (Dow Chemical) | 20 |
| Aq. Ammonia (28%) | 0.2 |
| TegoFoamex ® 840 defoamer (Evonik) | 0.8 |
| Triton ® CF-10 wetting agent (Dow Chemical) | 5.0 |
| Tional ® 696 rutile TiO2 (Cristal) | 500 |
| Total | 684 |

TABLE X

| Add in order: | Weight (g) |
|---|---|
| Coating example L | |
| Invention Example 6 from above | 240 |
| TegoFoamex ® 825 defoamer | 0.5 |
| White Pigment dispersion K from above | 48.5 |
| Byk ® 346 wetting agent (Altana) | 0.3 |
| Acrysol ® RM-8W thickener (Dow Chemical) | 2.6 |
| Total A component | 297.1 |
| Crosslinker: added at time of use | |
| Bayhydur ® XP-2655 polyisocyanate (Bayer MaterialScience) | 7 |
| Total B component | 7 |
| 2-k Formulation | |
| A Component (from above) | 315 |
| B Component (from above) | 7 |
| Theoretical stoichiometric ratio NCO:OH | 1.00 |

Comparative topcoat example Comp-M: a white 2-k acrylic-modified urethane topcoat, Sherthane® B65 W151 2k urethane, from Sherwin-Williams Protective and Marine Coatings.

The coating formulations were applied to a cold rolled steel substrate, S-412, available from Q-Labs, Inc. Prior to coating, the panels were wiped with acetone. For testing of direct impact resistance, the topcoat formulations were spray applied directly to the S-412 substrate, at a wet film thickness of about 5 mils (giving a dry film thickness of 1.8-2.0 mils), then air dried for at least two weeks prior to testing. For testing of corrosion resistance properties, the topcoat formulations were applied over a rust inhibitive high-build catalyzed polyamide/bisphenol A epoxy primer designed for fast dry and quick or extended recoatability, sold by Sherwin-Williams under the name "Recoatable Epoxy Primer". The primer was sprayed at a wet film thickness between 5 and 7 mils, then air-dried overnight in a lab hood, prior to applying the topcoat formulation at a wet film thickness of about 5 mils wet and air-drying for a minimum of two weeks prior to testing.

The topcoat low-temperature flexibility was also tested by a "double fold test". A #62 wire wound rod was used to apply a coating of about 1.0 mils dry film thickness to a piece of flexible PVC architectural fabric, primed with a polyamide primer. After air-drying for at least two weeks, the low-temperature flexibility was tested by equilibrating the coated fabric at a test temperature, then folding the fabric back on itself twice (coated side out), with the two folds at right angles to each other. Any cracking of the topcoat in the fold area is counted as a failure. The temperature was tested in 10° C. increments, and each sample was characterized by the lowest temperature giving a "pass".

Properties for white topcoats L and Comp-M:

TABLE XI

| | Coating example L | Comparative coating example Comp-M |
|---|---|---|
| Taber abrasion resistance, mg lost, CS-10 wheels, 500 cycles (lower values better) | 11 | 36 |
| Impact resistance on steel at 0° C., in-lbs. (higher values better) | 40 | 15 |
| Low temperature flexibility (double fold test on flexible PVC) | Pass 0° C. and all higher temperatures Marginal fail at −10° C. | Fail at +20° C. and all lower temperatures |

The coating from the L example formulation had much better abrasion resistance, losing only a third the amount of material from the abrading wheel, compared to the comparative example M. It also had better impact resistance at 0° C., and better low temperature flexibility, being highly flexible in the double fold test down to about 0° C. whereas the comparative control is not even flexible enough to pass at around room temperature.

The two coatings on primed steel were also tested for corrosion resistance using 1000 hours of salt fog testing according to ASTM B117. The two coatings had comparable corrosion resistance with average undercut corrosion from the scribe of about 1.6-1.7 mm for both systems.

Clear and Semi-Transparent Formulations

TABLE XII

| | Coating Example N for steel (DTM) | Comparative coating Example Comp-P for steel (DTM) | Coating Example Q for flexible fabric | Coating Example R stain for wood, cellulosic composites and concrete |
|---|---|---|---|---|
| Invention example 6, from above | 120 | | | |
| Invention example 7, from above | | | 120 | |
| Invention example 8, from above | | | | 800 |
| Comparative example 3, from above | | 100 | | |
| 28% NH3 to pH 10 | 2.6 | 1 | | |
| Tegofoamer ® 825 defoamer (Evonik) | 0.3 | | 0.3 | |
| Byk 346 wetting agent (Altana) | 0.2 | 0.2 | 0.2 | 2 |
| Acrysol ® RM-8W thickener (Dow Chemical) | 1.2 | 0.3 | 1.2 | 0 |
| Ethylene glycol n-butyl ether (coalescent) | 3.3 | | 3.3 | 20 |

TABLE XII-continued

| | Coating Example N for steel (DTM) | Comparative coating Example Comp-P for steel (DTM) | Coating Example Q for flexible fabric | Coating Example R stain for wood, cellulosic composites and concrete |
|---|---|---|---|---|
| Tinuvin ® 1130 (BASF) UV absorber | | | | 1.2 |
| UCD ® 1625E lampblack pigment dispersion (Chromaflo Technologies) | | | | 1.2 |
| UCD ® 5721E trans yellow oxide pigment dispersion (Chromaflo Technologies) | | | | 9.4 |
| UCD ® 5891E trans red oxide pigment dispersion (Chromaflo Technologies) | | | | 9.4 |
| Ammonium benzoate 15% in water | 7.1 | 7.1 | | |
| Water | | | | 500 |

| Properties | | | | |
|---|---|---|---|---|
| Conical mandrel test on aluminum at 0° C., for 1.2 mil dry film thickness | Pass <3 mm diameter | Fail at 20 mm diameter (i.e. all diameters tested, 3-20 mm) | Pass <3 mm diameter | Pass <3 mm diameter |
| Conical mandrel test on aluminum at −20° C., for 1.2 mil dry film thickness | Pass <3 mm diameter | Fail at 20 mm diameter (i.e. all diameters tested, 3-20 mm) | Not tested | Not tested |

The coatings from the invention examples have much better low temperature flexibility than the comparative example. At 0° C., the invention examples can be bent around a 3 mm diameter mandrel without cracking, while the comparative example cracks even when being bent around a 20 mm diameter mandrel with much lower curvature. Coating example N can be bent around a 3 mm diameter mandrel at even lower temperatures, down to at least −20° C.

| Caulk formulation | |
|---|---|
| | Caulk Example S |
| Invention example 5, from above | 606 |
| Kflex ® 975P (plasticizer-Emerald Kalama) | 107 |
| Propylene glycol | 9 |
| Triton ™ X-405 surfactant (Dow chemical) | 4 |
| Rhodoline ® 226/35 (Solvay) | 1.3 |
| Kathon ® LX (1.5%) (Dow Chemical) | 1.8 |
| Mineral spirits | 12 |
| Silane A-187 (organofunctional silane) | 1 |
| Drikalite ® (7micron calcium carbonate) | 394 |
| Rutile TiO2, coating grade | 6.5 |
| Natrosol ® 250 MHBR | 1.75 |
| Ammonium hydroxide 28% | 2.1 |

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

1. A stable aqueous fluoropolymer hybrid composition comprising:
   a) a fluoropolymer,
   b) a first vinyl polymer that is immiscible with said fluoropolymer, wherein said polymer has a Tg of less than 0° C., and comprises from 25-100 wt % of one or more monomer units having the following structures:
   acrylics: $CH_2=CH-C(=O)-OR$
   methacrylics: $CH_2=C(CH_3)-C(=O)-OR$
   wherein R is a hydrocarbon group of four or more carbons, and which may be a linear or branched hydrocarbon group, with the remainder of the first vinyl polymer comprising other monomer units selected singly or in any combination from the following monomers: acrylic and/or methacrylic monomers that have hydrocarbon ester groups of three or less carbons that may be linear or branched; styrene; alpha-methylstyrene; and up to 5 wt % of one or more functional monomer units different than styrene or alpha-methylstyrene,
   c) a second vinyl polymer that has a Tg of less than 0° C., comprising greater than 5 wt % functional monomer units, with some of the functional groups capable of crosslinking, 50 wt % acrylic and/or methacrylic monomer units, and up to 50 wt % of other monomer units capable of polymerizing with said acrylic and/or methacrylic monomer units,
   wherein free films made from formulations of the fluoropolymer hybrid composition, containing less than 10 wt % pigment and filler, have a dynamic mechanical analysis loss tangent, tan(δ), of greater than 0.22 and preferably greater than 0.25 and more preferably greater than 0.03 at a temperature of 0° C.
2. The stable aqueous fluoropolymer hybrid composition of aspect 1, wherein said fluoropolymer comprises 50 to 100 weight percent of vinylidene fluoride units, and 0 to 50 weight percent of vinyl monomer units copolymerizable with vinylidene fluoride.
3. The stable aqueous fluoropolymer hybrid composition of aspect 1 or 2, wherein said fluoropolymer comprises 50 to 100 weight percent of vinylidene fluoride units, and preferably from 70 to 100 weight percent, 0 to 30 weight percent hexafluoroethylene units, and 0-30 parts by weight of vinyl monomer units copolymerizable with vinylidene fluoride.
4. The stable aqueous fluoropolymer hybrid composition of any of aspects 1-3, wherein said fluoropolymer has a crystallinity of less than 30 J/g.
5. The stable aqueous fluoropolymer hybrid composition of any of aspects 1-4, wherein said composition has an MFFT of less than 5° C.
6. The stable aqueous fluoropolymer hybrid composition of any of aspects 1-5, wherein said first and second vinyl polymers are present in the dispersion at a weight ratio to each other of between 10:90 to 90:10, and preferably between 25:75 to 75:25.
7. The stable aqueous fluoropolymer hybrid composition of any of aspects 1-6, wherein said functional monomer units comprise one or more monomers selected from the group consisting of: unsaturated carboxylic acids; vinyl phosphonic and sulfonic acids; amide compounds; hydroxyl-containing monomers; allyl ether methacrylate; acetoacetoxy-containing monomers; vinyl acetate; epoxy containing monomers; monomers containing cyclic substituents; monomers containing silanols; fluoroalkyl acrylates and methacrylates; acrylonitrile and methacrylonitrile; polyol acrylates and polyol methacrylates, and mixtures thereof.

8. The stable aqueous fluoropolymer hybrid composition of any of aspects 1-7, wherein said first vinyl polymer has Tg of from −100° C. to 0° C.

9. The stable aqueous fluoropolymer hybrid composition of any of aspects 1-8, wherein said second vinyl polymer has Tgs of from −70° C. to 0° C.

10. The stable aqueous fluoropolymer hybrid composition of any of aspects 1-9, wherein said fluoropolymer comprises from 50 to 90 weight percent of the total polymer in said composition.

11. A process for forming an environmentally friendly fluoropolymer hybrid composition comprising the steps of:
   a) forming an aqueous fluoropolymer seed dispersion, wherein the fluoropolymer particles have a particle size of less than 300 nm;
   b) sequentially polymerizing at least two different vinyl monomer compositions in the presence of said fluoropolymer to form a stable fluoropolymer hybrid composition;
   where the first vinyl monomer composition forms a polymer that is immiscible with said fluoropolymer and has a Tg of less than 0° C. and less than 5% functional monomer units; and the second vinyl monomer composition forms a polymer having a Tg of less than 0° C., and contains greater than 5% functional monomer units,
   wherein free films made from formulations of the fluoropolymer hybrid compositions of the invention, containing less than 10 wt % pigment and filler, have a dynamic mechanical loss tangent (tan(δ)) at 0° C. of greater than 0.22.

12. A film comprising the fluoroopolymer hybrid composition of any of aspects 1-10.

13. A coating composition comprising the fluoropolymer hybrid composition of any of aspects 1-10.

14. The coating composition of claim 13, further comprising UV stabilizers, pH adjustment agents, colorants, dyes, water soluble resins, rheology control additives and thickeners, and pigments and pigment extenders, and filler.

15. The coating composition of aspect 3, 13 and 14, where an external crosslinking agent is added into the final formulation.

16. A coated substrate comprising a substrate having coated on at least one surface with said coating composition of any of aspects 13-15 and, wherein said coating composition is dried to form a coated substrate.

17. The coated substrate of aspect 21, wherein said substrate is selected from the group consisting of primed or unprimed metals, wood, glass, and plastic.

18. The coated substrate of aspect 17, wherein said dried fluoropolymer hybrid composition is cross-linked.

What is claimed is:

1. A stable aqueous fluoropolymer hybrid composition comprising:
   a. a fluoropolymer,
   b. a first vinyl polymer that is immiscible with said fluoropolymer, wherein said polymer has a Tg of less than 0° C., and comprises from 25-100 wt % of one or more monomer units having the following structures:
   acrylics: $CH_2=CH-C(=O)-OR$
   methacrylics: $CH_2=C(CH_3)-C(=O)-OR$
   wherein R is a hydrocarbon group of four or more carbons, and which may be a linear or branched hydrocarbon group, with the remainder of the first vinyl polymer comprising other monomer units selected singly or in any combination from the following monomers: acrylic and/or methacrylic monomers that have hydrocarbon ester groups of three or less carbons that may be linear or branched; styrene; alpha-methylstyrene; and up to 5 wt % of one or more functional monomer units different than styrene or alpha-methylstyrene,
   c. a second vinyl polymer that has a Tg of less than 0° C., comprising greater than 5 wt % functional monomer units, with some of the functional groups capable of crosslinking, 50 wt % acrylic and/or methacrylic monomer units, and up to 50 wt % of other monomer units capable of polymerizing with said acrylic and/or methacrylic monomer units,
   wherein free films made from formulations of the fluoropolymer hybrid composition, containing less than 10 wt % pigment and filler, have a dynamic mechanical analysis loss tangent, tan(δ), of greater than 0.22 at a temperature of 0° C.;
   wherein said fluoropolymer comprises 50 to 100 weight percent of vinylidene fluoride units, and 0 to 50 weight percent of vinyl monomer units copolymerizable with vinylidene fluoride, and has a particle size of less than 300 nm; and
   wherein said fluoropolymer comprises from 50 to 90 weight percent of the total polymer in said composition.

2. The stable aqueous fluoropolymer hybrid composition of claim 1, wherein said fluoropolymer comprises 50 to 100 weight percent of vinylidene fluoride units, 0 to 30 weight percent hexafluoroethylene units, and 0-30 parts by weight of vinyl monomer units copolymerizable with vinylidene fluoride, the total adding to 100 percent.

3. The stable aqueous fluoropolymer hybrid composition of claim 1, wherein said fluoropolymer comprises 70-100 weight percent of vinylidene fluoride units.

4. The stable aqueous fluoropolymer hybrid composition of claim 1, wherein said fluoropolymer has a crystallinity of less than 30 J/g.

5. The stable aqueous fluoropolymer hybrid composition of claim 1, wherein said composition has an MFFT of less than 5° C.

6. The stable aqueous fluoropolymer hybrid composition of claim 1, wherein said first and second vinyl polymers are present in the dispersion at a weight ratio of between 10:90 to 90:10.

7. The stable aqueous fluoropolymer hybrid composition of claim 6, wherein said first and second vinyl polymers are present in the dispersion at a weight ratio of between 25:75 to 75:25.

8. The stable aqueous fluoropolymer hybrid composition of claim 1, wherein said functional monomer units comprise one or more monomers selected from the group consisting of: unsaturated carboxylic acids; vinyl phosphonic and sulfonic acids; amide compounds; hydroxyl-containing monomers; allyl ether methacrylate; acetoacetoxy-containing monomers; vinyl acetate; epoxy containing monomers; monomers containing cyclic substituents; monomers containing silanols; fluoroalkyl acrylates and methacrylates; acrylonitrile and methacrylonitrile; polyol acrylates and polyol methacrylates, and mixtures thereof.

9. The stable aqueous fluoropolymer hybrid composition of claim 1, wherein said first vinyl polymer has a Tg of from −100° C. to 0° C.

10. The stable aqueous fluoropolymer hybrid composition of claim 1, wherein said second vinyl polymer has a Tg of from −70° C. to 0° C.

11. The stable aqueous fluoropolymer hybrid composition of claim 1, wherein said first vinyl polymer has a Tg of from −100° C. to 0° C., and said second vinyl polymer has a Tg of from −70° C. to 0° C.

12. The stable aqueous fluoropolymer hybrid composition of claim 1, wherein free films made from formulations of the fluoropolymer hybrid compositions of the invention, containing less than 10 wt % pigment and filler, have a dynamic mechanical loss tangent (tan(δ)) at 0° C. of greater than 0.25.

13. The stable aqueous fluoropolymer hybrid composition of claim 1, wherein free films made from formulations of the fluoropolymer hybrid compositions of the invention, containing less than 10 wt % pigment and filler, have a dynamic mechanical loss tangent (tan(δ)) at 0° C. of greater than 0.30.

14. A film comprising the fluoropolymer hybrid composition of claim 1.

15. A coating composition comprising the fluoropolymer hybrid composition of claim 1.

16. The coating composition of claim 15, further comprising UV stabilizers, pH adjustment agents, colorants, dyes, water soluble resins, rheology control additives and thickeners, and pigments and pigment extenders, and filler.

17. The coating composition of claim 15, where an external crosslinking agent is added to the final formulation.

18. A coated substrate comprising a substrate having coated on at least one surface with said coating composition of claim 1, wherein said coating composition is dried to form a coated substrate.

19. The coated substrate of claim 18, wherein said substrate is selected from the group consisting of primed or unprimed metals, wood, glass, and plastic.

20. The coated substrate of claim 18, wherein said dried fluoropolymer hybrid composition is cross-linked.

21. A process for forming an environmentally friendly fluoropolymer hybrid composition comprising the steps of:
   a. forming an aqueous fluoropolymer seed dispersion, wherein the fluoropolymer particles have a particle size of less than 300 nm;
   b. sequentially polymerizing at least two different vinyl monomer compositions in the presence of said fluoropolymer to form a stable fluoropolymer hybrid composition;

where the first vinyl monomer composition forms a polymer that is immiscible with said fluoropolymer and has a Tg of less than 0° C. and less than 5% functional monomer units; and the second vinyl monomer composition forms a polymer having a Tg of less than 0° C., contains at least 50 wt % acrylic and/or methacrylic monomer units and greater than 5% functional monomer units, wherein free films made from formulations of the fluoropolymer hybrid compositions of the invention, containing less than 10 wt % pigment and filler, have a dynamic mechanical analysis loss tangent, (tan(δ)), at 0° C. of greater than 0.22,
   wherein said fluoropolymer comprises 50 to 100 weight percent of vinylidene fluoride units, and 0 to 50 weight percent of vinyl monomer units copolymerizable with vinylidene fluoride, and has a particle size of less than 300 nm; and
   wherein said fluoropolymer comprises from 50 to 90 weight percent of the total polymer in said composition.

* * * * *